United States Patent [19]
Tai et al.

[11] Patent Number: 5,724,015
[45] Date of Patent: Mar. 3, 1998

[54] BULK MICROMACHINED INDUCTIVE TRANSDUCERS ON SILICON

[75] Inventors: Yu-Chong Tai, Pasadena; Denny K. Miu, Valencia; Weilong Tang, Alhambra; Viktoria Temesvary, Culver City; Shuyun Wu, Pasadena, all of Calif.

[73] Assignee: California Institute of Technology, Pasadena, Calif.

[21] Appl. No.: 457,468

[22] Filed: Jun. 1, 1995

[51] Int. Cl.⁶ .................................................. H01H 51/22
[52] U.S. Cl. ........................ 335/78; 361/160; 257/415
[58] Field of Search ........................... 335/78–86, 128, 335/124, 131; 257/415, 421–2, 428, 666–8, 690, 734, 689; 361/160, 206, 819

[56] References Cited

U.S. PATENT DOCUMENTS

| | | | |
|---|---|---|---|
| 4,386,244 | 5/1983 | Murakami et al. | 179/179 |
| 5,398,011 | 3/1995 | Kimura et al. | 335/79 |

*Primary Examiner*—Lincoln Donovan
*Attorney, Agent, or Firm*—Skjerven, Morrill, MacPherson, Franklin & Friel; Norman R. Klivans; E. Eric Hoffman

[57] ABSTRACT

A bulk micromachined inductive transducer on single crystal silicon. The bulk micromachined micro-device has movable parts integrated with electromagnetically-driven microactuators for moving the parts. The integrated electromagnetic microactuators of the present micromachine move the movable parts in in-plane and/or out-of-plane sub-millimeter level motions in either translational or rotational directions.

24 Claims, 3 Drawing Sheets

5,724,015

BULK MICROMACHINED INDUCTIVE TRANSDUCERS ON SILICON

BACKGROUND OF THE INVENTION

1. Origin of the Invention

The invention described herein was made in the performance of work under an ARPA contract, specifically ARPA Grant No. MDA 972-93-1-0009, and is subject to the provisions of Public Law 96-517 (35 USC 202) in which the contractor has elected to retain title.

2. Field of the Invention

The present invention relates generally to micromachines and particularly to bulk micromachined silicon defining structurally movable parts integrated with inductive transducers in the form of electromagnetic planar microactuators for moving the movable parts in in-plane or out-of-plane motions in either translational or rotational sub-millimeter level directions.

RELATED ART

Existing micromachined micromotors include microdevices that are either inductive sensors without moving parts or electro-static actuators with moving parts. For example, bulk micromachined non-inductive microactuators with movable parts exist in the form of electrostatic microdevices. The micro movable parts are typically made of stainless steel with the various micro features manufactured by a combination of chemical etching, precision stamping, and metal forming operations. Also, non-bulk micromachined inductive microactuators exist in the form of micro electromagnetic microactuators without integrated movable parts.

However, bulk micromachined micro-devices on single crystal silicon having moving parts with integrated inductive transducers, in the form of sensors or actuators, do not exist. Although surface micromachined silicon micro-devices with deposited structures on a top surface of the silicon exist, bulk micromachined inductive transducers on silicon do not.

Therefore, what is needed is a bulk micromachined microdevice having a moving element with an integrated electromagnetically-driven microactuator. What is additionally needed is a micromachine having moving parts capable of in-plane and/or out-of-plane motion both with translational and/or rotational motion driven by an electromagnetic actuator.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present specification discloses a bulk micromachined inductive transducer on single-crystal silicon.

The silicon micro-device of the present invention is bulk micromachined to define movable parts integrated with electromagnetically-driven microactuators for moving the parts. The integrated electromagnetic microactuators of the present invention move the movable parts in in-plane and/or out-of-plane sub-millimeter level motions in either translational or rotational directions. As employed in this specification, the term transducer refers alternatively to a sensor and an actuator.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
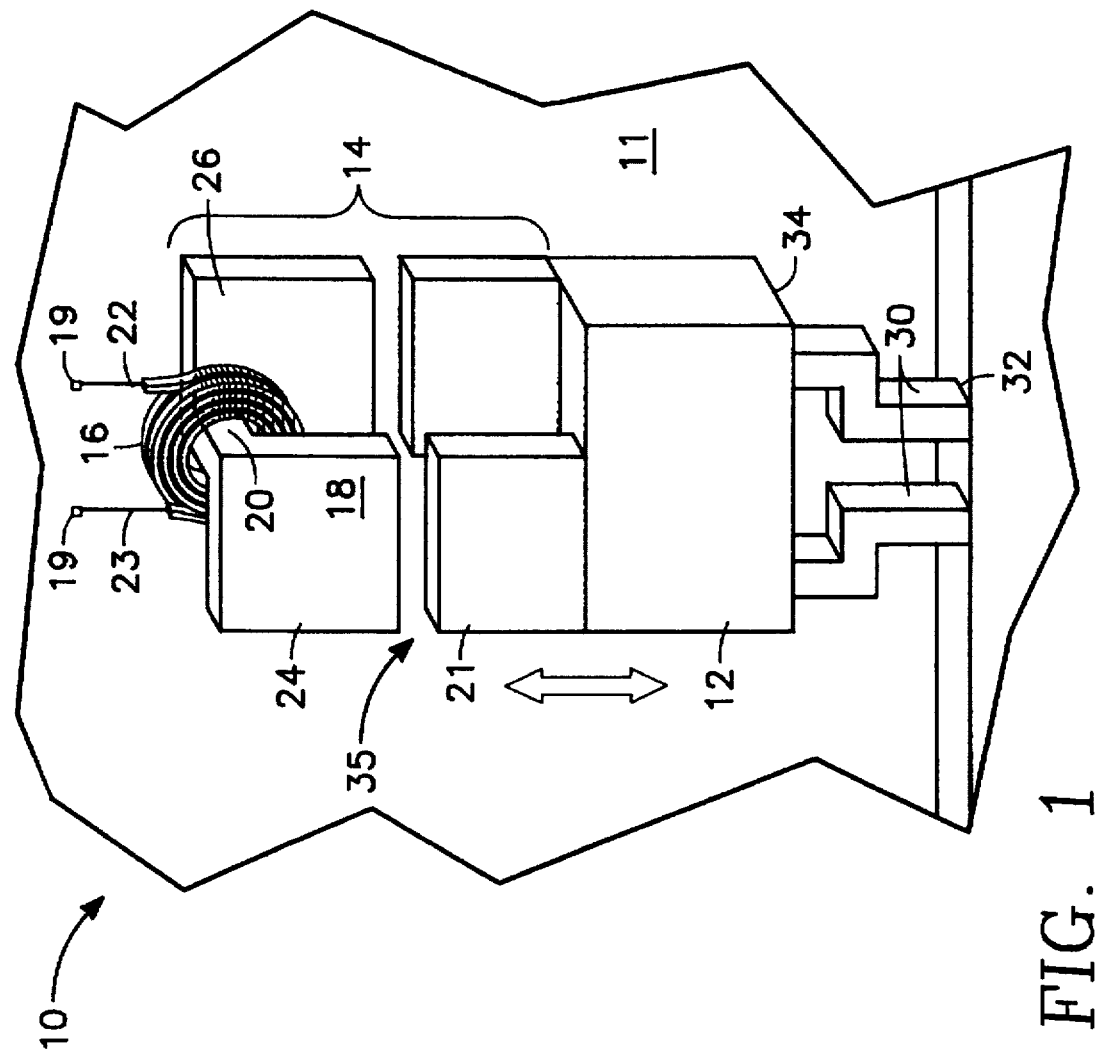
FIG. 1 substrates a bulk micro-machined inductive transducer on silicon of the present invention.

FIG. 1 illustrates a bulk micro-machined inductive transducer on silicon of the present invention. The micro-device 10 of the present invention is micromachined out of a bulk silicon substrate 11 to define a movable micro silicon element 12 and an electromagnetic microactuator 14 for moving the silicon micro element 12.

The electromagnetic microactuator 14 includes a conductive coil 16, such as copper, with a stator in the form of a stationary ferromagnetic core 18, such as NiFe, extending through a center 20 of the coiled conductor 16. The microactuator 14 further includes a movable core 21 attached to the moving silicon micro element 12 and can be a ferromagnetic core or a permanent magnet in the form of a thin film on the movable element.

The conductive coil 16 is preferably a planar coil and has two leads 19 for connecting to a current source. Preferably, however, the conductive coil 16 includes a top layer of planar coils 22 and a bottom layer of planar coils 23 terminating in outer leads 19 for connection to a current source. Both coil layers 22, 23 are wound in spiral fashion from an outer end (connected to a respective terminal 19) to an inner end, and the inner ends of the two coil layers 22, 23 are connected together.

Figure 2:
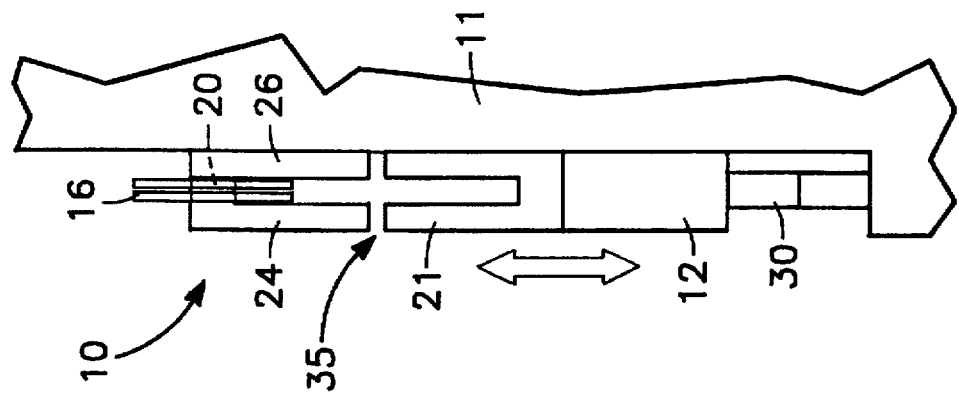
FIG. 2 illustrates a cross sectional side view of the bulk micro-machined inductive transducer on silicon of FIG. 1.

FIG. 2 illustrates a cross sectional side view of the bulk micro-machined inductive transducer on silicon of FIG. 1. The planar coil 16 is sandwiched between a top portion 24 and a bottom portion 26 of the stationary core 18. The top portion 24 of the stationary core 18 partially overlies the planar coil 16 and extends through the center 20 of the planar coil to join with the bottom portion 26 of the stationary core 18. The conductive coil can also be a wrap around coil (not shown) with the coil being helically wrapped around the stationary core 18.

The micro-device 10 also includes elastic micro mechanical elements, such as microsprings 30 supporting the movable element 12. The microsprings 30 are anchored at one end 32 to a fixed location, such as another portion of the silicon substrate 11, and connected at an opposite end 34 to the movable silicon micro element 12, for resiliently supporting the movable element 12.

Magnetic flux, as indicated by the solid arrow, circulates from the top portion 24, through the center 20 of the coil 16, and through the bottom portion 26 of the stationary core 18 when a current is applied to the coil 16. The generated magnetic flux stores energy in the air gap 35 between the stationary core 18 and the movable core 21. To minimize the stored energy, forces are exerted on the movable core 21 when a current is applied to the coil 16, thereby pulling the movable core 21 in a direction away from an original position so that the air gap 35 is minimized.

When the current is removed, the microsprings 30 resiliently retract the movable core 21 so that the movable core 21 attached to the movable element 12 returns back to its original location. If the movable core 21 is a permanent magnet, polarity changes in current through the coil dictates the movement of the movable core 21 instead of on/off pulses of current. Thus, depending on the particular configuration of the stationary core 18, the movable core 21 and the fixed microsprings 30, the micro element 12 can be moved in in-plane and/or out-of-plane motion in either translational and/or rotational directions.

The bulk micromachined inductive transducer is fabricated in the bulk silicon substrate 11 by first removing most of the bulk material. The silicon substrate is not surface micromachined by bonding structures (such as springs, movable elements and the like) on top of the silicon. The remaining portion defines a membrane with micro structures.

The resulting micro structures define the movable micro elements 12 capable of in-plane or out-of-plane motion either in translational or rotational directions. Also, other flexible mechanical parts, such as the microsprings, are bulk micromachined in a similar fashion. Next, the microactuator or an inductive active element with integrated inductive coils is micromachined from the bulk silicon substrate 11 and fabricated with the necessary electromagnetic components, such as the copper coils and the ferromagnetic cores, using existing silicon micro-fabrication techniques.

The applications for the micromachine with integrated electromagnetic microactuator of the present invention are very broad. The micromachine can be used in both passive and active microstructures, such as with miniaturized disk drive components to significantly reduce form factors and to increase recording density of future magnetic recording rigid disk drives, flexible disk drives, optical drives and/or tape systems. The bulk micromachined inductive transducer on single-crystal silicon can also be used for the fabrication of thin film inductive electromagnetically-driven microactuators.

For example, the micromachine can be used as a sensor or actuator in numerous devices, such as a sensor to detect voltage or current changes or as an actuator to move a recording head, magnetic or optical, a mirror, or to switch fiber optics in a photonic system. Further, there are many applications outside of computer storage systems and peripherals, including, but not limited to, optical switches, pumps, valves, and micro flaps, utilizing both in-plane and out-of-plane motions in either translational or rotational motions.

Figure 3:
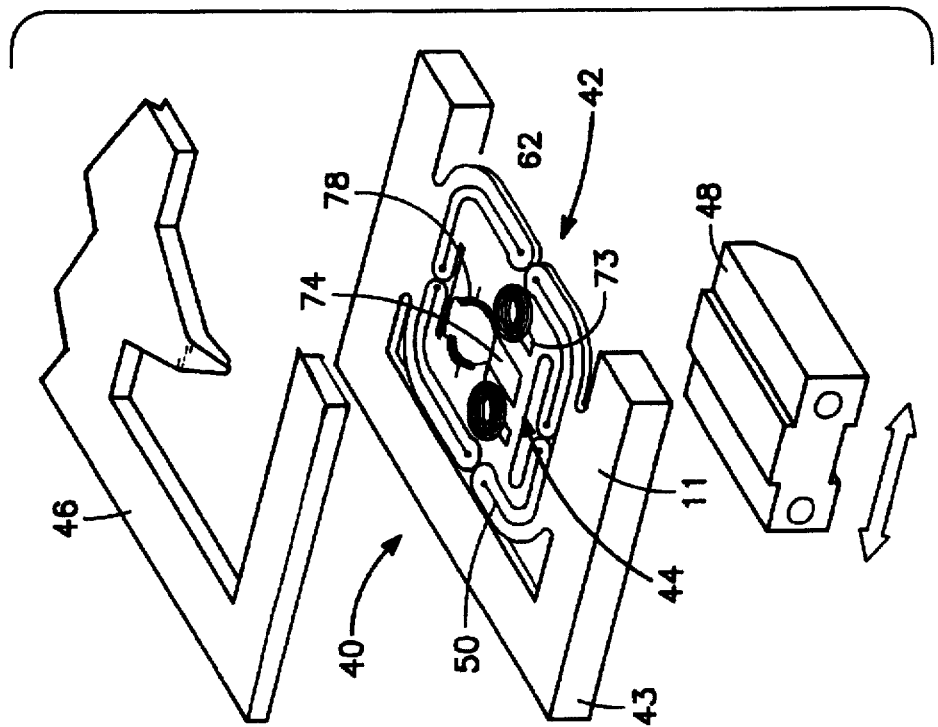
FIG. 3 illustrates an exploded view of a microgimbal with an electromagnetic microactuator of the present invention.

FIG. 3 illustrates an exploded view of a microgimbal 40 including an electromagnetic microactuator 44 of the present invention. The silicon microgimbal 40 is bulk micromachined from a silicon substrate 11 to define an outer frame 43. An integrated planar piggyback electromagnetically-driven microactuator 44 is also bulk micromachined in the silicon substrate 11 and is coupled to the outer frame 43 by elastic planar serpentine micromachined springs 50 micromachined in the silicon substrate 11. The substrate is preferably single-crystal bulk silicon. The microactuator 44 is described below in greater detail with reference to FIG. 4 and includes planar coils 62, stationary cores 73, and a movable core 74 on a movable silicon member (not visible in the view of FIG. 3) micromachined in the substrate 11.

The microgimbal 40 is sandwiched between a stainless steel suspension arm 46 and a slider 48 containing the read/write transducer head of a conventional magnetic disk drive. The movable silicon member underlying the movable core 74 is bonded to the slider 48.

The piggyback microactuator 44 moves the slider relative to the suspension 46. Thus, this configuration allows the read/write head to be moved in in-plane motion relative to the microgimbal 40 and suspension 46 assembly as indicated by the solid arrow. Preferably, the center coupon 82 measures less than 1.5 millimeters square.

The advantage of this arrangement is that structural resonance in the suspension arm 46 is reduced or eliminated from the servo loop, allowing a substantial increase in servo bandwidth. In addition, this arrangement can be very low-profile such that it is consistent with the disk-to-disk spacing requirement of high capacity disk drives and future products. In addition, it is also mass-manufacturable and operates in low-voltage, low-power environments. Further, electrical interference is at an absolute minimum in order to prevent degradation of the read/write operations.

Since the planar springs 50 have spring-like characteristics and are soft but stiff in lateral directions, maximum in-plane compliance is maintained while adequate out-of-plane, pitch and roll stiffness of the microgimbal 40 is maintained.

Given the form factor needed in high density disk drives, it is impractical to design small springs out of stainless steel sheet for such-disk drives. Therefore, the serpentine microsprings 50 are micromachined in silicon. They are located at the four corners of the microgimbal 40 as a microsuspension in order to satisfy the connecting out-of-plane compliance, lateral stiffness, and shock resistance design requirements.

Although silicon is a brittle material, it is also an elastic material. The ultimate strength of silicon microstructures is orders of magnitude higher than that in bulk form. Therefore, the flexible silicon microsuspensions of the present invention has very high load-carrying a capacity.

The silicon micro-gimbal of FIG. 3 has a number of potential operational advantages. First, since silicon is a brittle material, silicon suspensions cannot be plastically deformed during manufacturing and handling, a significant advantage. Unlike ductile material, silicon will not yield, and fractures when the stress reaches the ultimate strength. Detecting deformation in such structures therefore requires only visual inspection. In comparison, plastic deformation of stainless steel suspensions (i.e., de-programming) is more difficult to detect and is the major contributing factor of reduced production yield and in-drive performance problems.

Further, it is relatively easy to incorporate electrodes (or even pre-amps) in the suspension areas of the gimbal 40, such as microsprings 50, as well as an electrical coupler in the center of the gimbal 40, thereby allowing the possibility of automating not only the mechanical but also the electrical interconnect manufacturing procedures.

Thus, since the silicon microgimbal and microsuspension of the present invention is sub-millimeter in size and soft enough for head/media compliance, yet stiff enough for tracking with high force per unit area and also strong enough to survive shocks on the order of hundreds of g's, the servo bandwidth of the disk drive systems utilizing the microgimbal of the present invention is relatively high with large strokes, fast response times and low required voltages.

Figure 4:
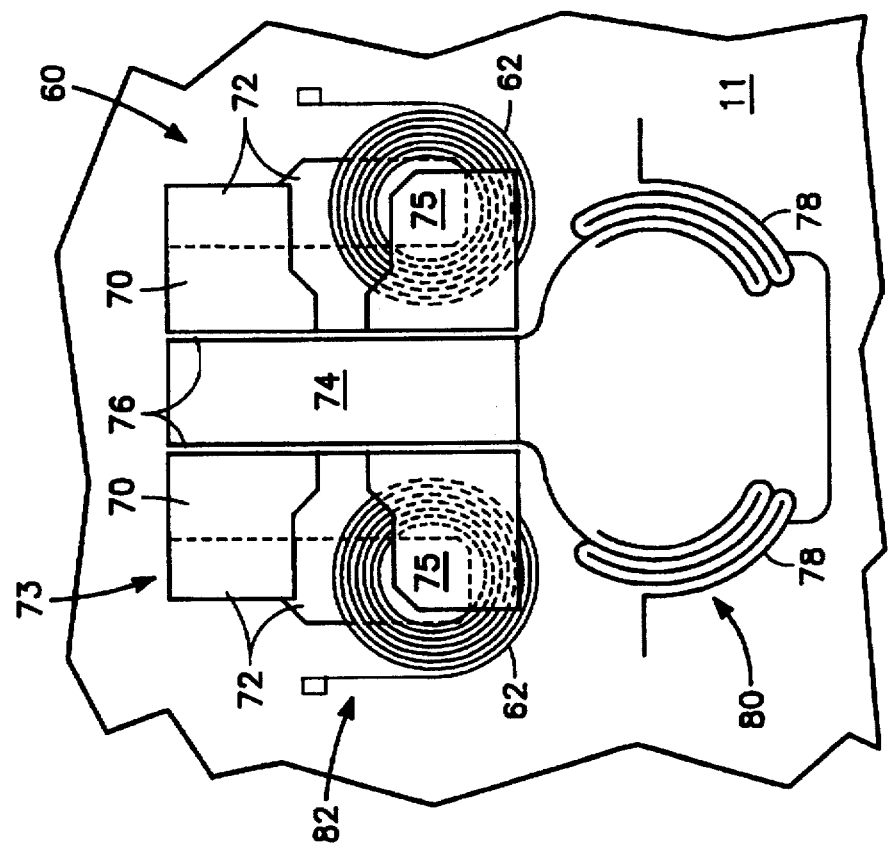
FIG. 4 illustrates a top view of the microactuator of the microgimbal of FIG. 3.
Figure 6:
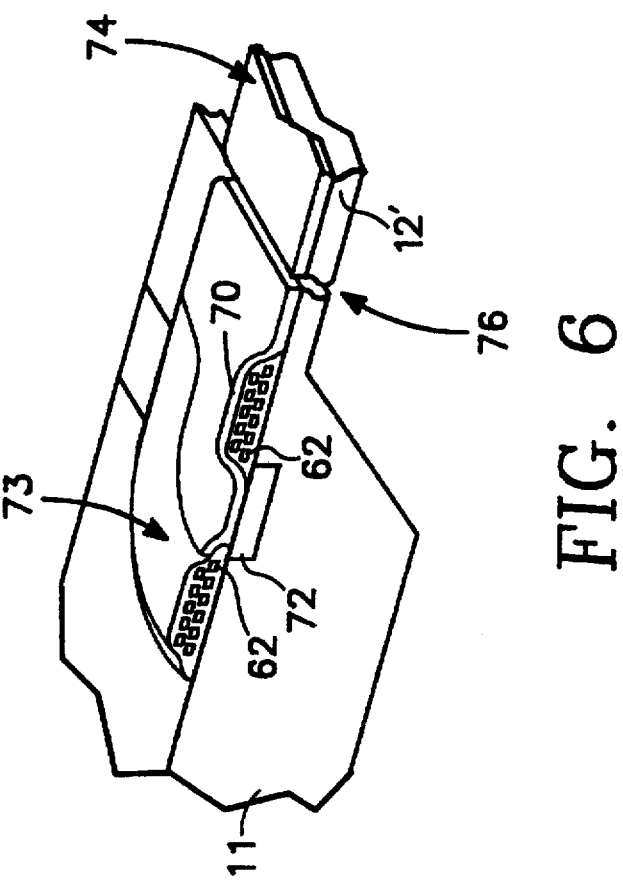
FIG. 6 illustrates a perspective cut away view of FIG. 4 in accordance with one embodiment of the invention.

FIG. 4 illustrates a top view of the microactuator 44 of the microgimbal 40 of FIG. 3. The electromagnetic microactuator 44 can consist of two or more sets of individual planar copper coils 62. Each coil 62 can, in a preferred embodiment, consist of two coil layers 63, 65 with insulation 77 separating the layers 63, 65 as illustrated in FIGS. 5B and 6. FIG. 5B illustrates an embodiment in which coils 62, top permalloy layers 70 and bottom permalloy layers 72 are fabricated on a thin portion of the substrate 11. FIG. 6 (and FIG. 5A) illustrates an embodiment in which coils 62, top permalloy layers 70 and bottom permalloy layers 72 are fabricated on a portion of the substrate 11 which is thicker than the portion of the substrate 11 which forms the movable silicon member 12'. Each coil 62 is sandwiched between a top permalloy layer 70 and a bottom permalloy layer 72 of a stationary core 73 as illustrated in FIGS. 5B and FIG. 6.

The top portion 70 of each stationary core 73 overlies the planar coil 62 and extends through a center 75 of each planar coil 62 to join with the bottom portion 72 of the stationary core 73 in a U-shaped configuration. Alternatively, the conductive coil 62 can be a wrap around coil (not shown) with the coil being helically wrapped around the stationary core 73.

Figure 5A:
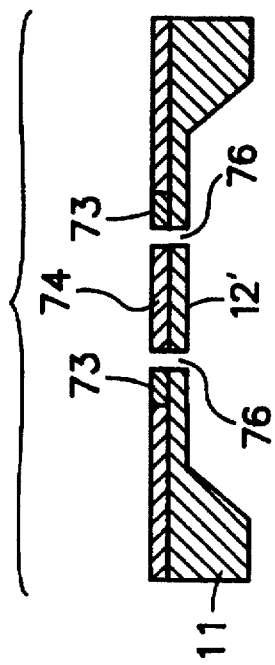
FIG. 5A illustrates a cross sectional side view of the movable part of FIG. 4 in accordance with one embodiment of the invention.
Figure 5B:
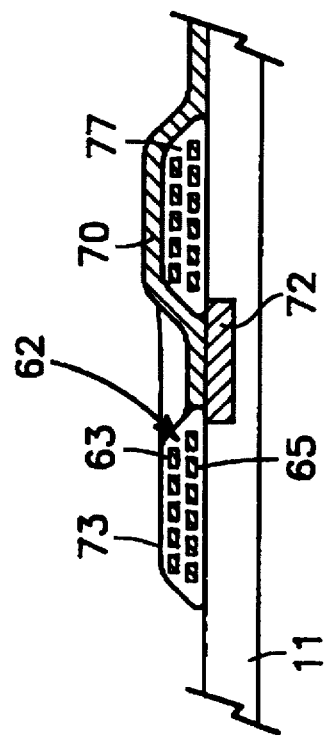
FIG. 5B illustrates a cross sectional side view of the stator of FIG. 4 in accordance with one embodiment of the invention.

A center permalloy movable core 74 is deposited on a movable silicon member 12' (FIG. 5A). The movable silicon member is micromachined in the silicon substrate 11. The movable silicon member 12' and the movable core 74 are located between the two stationary cores 73. Air gaps 76 are formed between the movable core 74 and the stationary cores 73 as shown in FIG. 5A. A set of planar silicon microsprings 78 are fixed at one end in the substrate 11 and connected to the movable core 74 at suitable locations at an opposite end to provide resilient support of the movable core 74.

The microsprings 78 are micromachined from the bulk silicon and fixed to the substrate 11 at the bottom half 80 of the microactuator 44. The microsprings 78 can be a set of hairpin-like planar microsprings, and they allow the slider 48 to move in-plane relative to the microgimbal 40. The hairpin-like planar microsprings 78 are composed of alternating curved beams. Beam widths and stress relief holes of the microsprings 78 around the turns are structured to be suitably sized to optimize performance.

A top half of the center coupon 82 is devoted to the variable reluctance electromagnetic microactuator 44 and the bottom half 80 to the planar microsprings 78, thereby significantly increasing the contact area between the movable center core 74 and the slider 48.

When a current is applied to a selected one of the two coils 62, magnetic flux circulates from the top portion 70, through the center of the coil 75, and through the bottom portion 72 of the stationary core 73. The generated magnetic flux stores energy in the air gap 76 between the U-shaped stationary core 73 and the movable center core 74. To minimize the stored energy, forces are exerted on the center core 74, pulling it toward the stationary core 73 that has a current applied to it, thereby generating in-plane motion of the moving part and slider 48. In addition, current can be applied to each of the two coils 62 at different times, or at the same time with a different current at each coil, to effectuate motion of the slider 48.

Alternatively, a permanent magnet can be used as a center movable core 74, thereby allowing the polarity of the current applied to each set of coils to dictate the movement of the movable core 74. Depending upon the selected configuration of the stationary cores 73 with respect to the movable core 74 and the fixed microsprings 78, the movable core 74 can be moved in in-plane and/or out-of-plane motion in either translational and/or rotational sub-millimeter level directions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A micromachine comprising:
   a crystalline substrate;
   a movable element which is formed from a first portion of said substrate; and
   an electromagnetic transducer fabricated over said substrate, wherein a portion of said electromagnetic transducer is coupled to said movable element.

2. The micromachine as set forth in claim 1, wherein the first portion of said substrate is coupled to an adjacent second portion of said substrate by one or more spring elements formed from a third portion of said substrate.

3. The micromachine as set forth in claim 1, further comprising electrodes fabricated over said substrate for providing a path of electrical power to said transducer.

4. The micromachine as set forth in claim 1 wherein said transducer comprises:
   a planar inductive coil located over said substrate; and
   a movable magnetic core coupled to said movable element.

5. The micromachine as set forth in claim 4, wherein the transducer further comprises a stationary magnetic core located over said substrate, said stationary magnetic core extending through a central region of said planar coil and having ends which are located adjacent to said movable magnetic core.

6. The micromachine as set forth in claim 5 wherein said stationary magnetic core comprises a lower portion underlying said coil and an upper portion partially overlying said coil, wherein said upper and lower portions of said stationary magnetic core are joined at the central region of the coil.

7. The micromachine as set forth in claim 1 wherein said transducer comprises:
   a plurality planar inductive coils on said substrate;
   a plurality of stationary magnetic cores comprising one stationary magnetic core for each one of said coils, each stationary magnetic core being micromachined in said substrate and comprising:

(a) a first upper portion facing said movable magnetic core and partially overlying the corresponding coil;

(b) a bottom portion partially underlying said corresponding coil, said first upper portion extending through a center opening of said corresponding coil to join with said bottom portion near one end of said bottom portion;

(c) a second upper portion facing said movable magnetic core, said second upper portion extending toward said bottom portion to join with said bottom portion near an opposite end of said bottom portion; and a movable magnetic core attached to said movable element, said movable magnetic core being located adjacent to said plural stationary cores and separated therefrom by an air gap.

8. The micromachine as set forth in claim 1 wherein said substrate is silicon.

9. The micromachine as set forth in claim 1 wherein said transducer comprises an actuator for moving the movable element.

10. A method for fabricating a micromachine from a substrate, the method comprising the steps of:

fabricating a movable element from a first portion of the substrate; and fabricating an electromagnetic transducer over the substrate, wherein a portion of the electromagnetic transducer is fabricated over the moveable element.

11. The method of claim 10 wherein the step of fabricating the movable element further comprises the steps of:

micromachining a pattern which extends through said substrate, said pattern defining said movable element and one or more spring elements which couple said movable element to a remaining portion of said substrate.

12. The method of claim 10, wherein said substrate is single crystal silicon.

13. The micromachine as set forth in claim 2, wherein an air gap exists between the first and second portions of the substrate.

14. The micromachine as set forth in claim 13, wherein the transducer comprises:

a coil located over the second portion of the substrate;

a stationary magnetic core located over the second portion of the substrate, wherein the stationary magnetic core extends through a center region of the coil; and a movable magnetic core located over the first portion of the substrate, adjacent to the stationary magnetic core, wherein the stationary magnetic core and the movable magnetic core are separated by the air gap.

15. The micromachine of claim 4, wherein the movable magnetic core comprises permalloy.

16. The micromachine of claim 4, wherein the movable magnetic core comprises a permanent magnetic material.

17. The micromachine of claim 4, wherein the movable magnetic core comprises a layer of magnetic material located over the movable element.

18. The micromachine as set forth in claim 6, wherein the stationary magnetic core further comprises a second upper portion coupled to the lower portion outside of a perimeter of said coil.

19. The micromachine as set forth in claim 8, wherein the substrate comprises single crystal silicon.

20. The micromachine as set forth in claim 1 wherein said transducer comprises a sensor for detecting movement of the movable element.

21. The micromachine of claim 1, wherein the first, second and third portions of the substrate form a central coupon, the micromachine further comprising:

a frame formed from the substrate, wherein the frame surrounds the central coupon; and a plurality of gimbal spring elements formed from the substrate, wherein the gimbal spring elements couple the frame to the central coupon.

22. The micromachine of claim 5, wherein the stationary magnetic core comprises a ferromagnetic material.

23. The micromachine of claim 1, wherein the substrate has an upper surface which defines a plane, and the movable element is compliant in the plane defined by the upper surface of the substrate.

24. The method of claim 11, wherein the step of fabricating the transducer further comprises the steps of:

fabricating a coil and a stationary magnetic core over the remaining portion of the substrate, adjacent to said pattern; and fabricating a movable magnetic core over the movable element.

* * * * *